US012142809B2

(12) United States Patent
Yang et al.

(10) Patent No.: US 12,142,809 B2
(45) Date of Patent: Nov. 12, 2024

(54) BIDIRECTIONAL RF COUPLER WITH SWITCHABLE COUPLED TRANSMISSION LINES FOR OPERATION OVER DIFFERENT FREQUENCY BANDS

(71) Applicant: SKYWORKS SOLUTIONS, INC., Irvine, CA (US)

(72) Inventors: Zijiang Yang, Lexington, MA (US); Sriram Srinivasan, Bedford, MA (US); Nuttapong Srirattana, Lexington, MA (US)

(73) Assignee: SKYWORKS SOLUTIONS, INC., Irvine, CA (US)

( * ) Notice: Subject to any disclaimer, the term of this patent is extended or adjusted under 35 U.S.C. 154(b) by 313 days.

(21) Appl. No.: 17/676,952

(22) Filed: Feb. 22, 2022

(65) Prior Publication Data

US 2022/0271409 A1 Aug. 25, 2022

Related U.S. Application Data

(60) Provisional application No. 63/152,409, filed on Feb. 23, 2021.

(51) Int. Cl.
*H01P 5/18* (2006.01)
*H01P 1/10* (2006.01)

(52) U.S. Cl.
CPC . *H01P 5/18* (2013.01); *H01P 1/10* (2013.01)

(58) Field of Classification Search
CPC ........................................................ H01P 5/18
USPC ........................................................ 333/111
See application file for complete search history.

(56) References Cited

U.S. PATENT DOCUMENTS 3,611,199 A 10/1971 Safran
3,868,594 A 2/1975 Cornwell et al.
4,460,875 A 7/1984 Harman
4,677,399 A 6/1987 Le Dain et al.
4,764,740 A 8/1988 Meyer
5,038,112 A 8/1991 O'Neill
5,222,246 A 6/1993 Wolkstein
5,276,411 A 1/1994 Woodin, Jr. et al.
(Continued)

FOREIGN PATENT DOCUMENTS

CN 108470968 A 8/2018
EP 2503701 A2 9/2012
(Continued)

OTHER PUBLICATIONS

Chen et al., "A High-Directivity Microstrip Directional Coupler With Feedback Compensation", 2002 IEEE MTT-S International Microwave Symposium Digest, issued in 2002, pp. 101-104.

*Primary Examiner* — Benny T Lee
(74) *Attorney, Agent, or Firm* — Lando & Anastasi, LLP

(57) ABSTRACT

A radio frequency signal coupler includes an input port, an output port, a main transmission line coupled between the input port and the output port, and a coupled transmission line electromagnetically coupled to the main transmission line. The coupled transmission line includes a first transmission line, a second transmission line, and a switch configured to couple the first and second transmission lines during a first mode of operation and to decouple the first and second transmission lines during a second mode of operation. The radio frequency couple can be used in a front end module of a communications device, such as a mobile phone.

24 Claims, 11 Drawing Sheets

(56) References Cited

U.S. PATENT DOCUMENTS

| | | | |
|---|---|---|---|
| 5,363,071 | A | 11/1994 | Schwent et al. |
| 5,487,184 | A | 1/1996 | Nagode |
| 5,625,328 | A | 4/1997 | Coleman, Jr. |
| 5,745,016 | A | 4/1998 | Salminen |
| 5,767,753 | A | 6/1998 | Ruelke |
| 5,903,820 | A | 5/1999 | Hagstrom |
| 6,020,795 | A | 2/2000 | Kim |
| 6,078,299 | A | 6/2000 | Scharfe, Jr. |
| 6,108,527 | A | 8/2000 | Urban et al. |
| 6,329,880 | B2 | 12/2001 | Akiya |
| 6,496,708 | B1 | 12/2002 | Chan et al. |
| 6,559,740 | B1 | 5/2003 | Schulz et al. |
| 6,771,141 | B2 | 8/2004 | Iida et al. |
| 6,803,818 | B2 | 10/2004 | van Amerom |
| 6,972,640 | B2 | 12/2005 | Nagamori et al. |
| 7,042,309 | B2 | 5/2006 | Podell |
| 7,224,244 | B2 | 5/2007 | Drapac et al. |
| 7,230,316 | B2 | 6/2007 | Yamazaki et al. |
| 7,236,069 | B2 | 6/2007 | Puoskari |
| 7,305,223 | B2 | 12/2007 | Liu et al. |
| 7,319,370 | B2 | 1/2008 | Napijalo |
| 7,336,142 | B2 | 2/2008 | Vogel |
| 7,493,093 | B2 | 2/2009 | Boerman et al. |
| 7,538,635 | B2 | 5/2009 | Fukuda et al. |
| 7,546,089 | B2 | 6/2009 | Bellantoni |
| 7,966,140 | B1 | 6/2011 | Gholson, III et al. |
| 7,973,358 | B2 | 7/2011 | Hanke et al. |
| 8,115,234 | B2 | 2/2012 | Nakajima et al. |
| 8,175,554 | B2 | 5/2012 | Camuffo et al. |
| 8,248,302 | B2 | 8/2012 | Tsai et al. |
| 8,289,102 | B2 | 10/2012 | Yamamoto et al. |
| 8,315,576 | B2 | 11/2012 | Jones |
| 8,334,580 | B2 | 12/2012 | Sakurai et al. |
| 8,417,196 | B2 | 4/2013 | Kitching et al. |
| 8,526,890 | B1 | 9/2013 | Chien et al. |
| 8,606,198 | B1 | 12/2013 | Wright |
| 8,633,761 | B2 | 1/2014 | Lee |
| 8,761,026 | B1 | 6/2014 | Berry et al. |
| 8,810,331 | B2 | 8/2014 | Gu et al. |
| 9,014,647 | B2 | 4/2015 | Kitching et al. |
| 9,214,967 | B2 | 12/2015 | Reisner et al. |
| 9,225,382 | B2 | 12/2015 | Khlat |
| 9,356,330 | B1 | 5/2016 | Donoghue et al. |
| 9,425,835 | B2 | 8/2016 | Seckin et al. |
| 9,496,902 | B2 | 11/2016 | Srirattana et al. |
| 9,553,617 | B2 | 1/2017 | Srirattana et al. |
| 9,614,269 | B2 | 4/2017 | Srirattana et al. |
| 9,634,371 | B2 | 4/2017 | Swarup et al. |
| 9,647,314 | B1 | 5/2017 | Nguyen et al. |
| 9,692,103 | B2 | 6/2017 | Srirattana et al. |
| 9,748,627 | B2 | 8/2017 | Sun et al. |
| 9,755,670 | B2 | 9/2017 | Chen et al. |
| 9,793,592 | B2 | 10/2017 | Srirattana et al. |
| 9,812,757 | B2 | 11/2017 | Srirattana et al. |
| 9,866,244 | B2 | 1/2018 | Srirattana et al. |
| 9,941,856 | B2 | 4/2018 | Srirattana et al. |
| 9,948,271 | B2 | 4/2018 | Srirattana et al. |
| 9,953,938 | B2 | 4/2018 | Srirattana et al. |
| 9,954,564 | B2 | 4/2018 | Little et al. |
| 9,960,747 | B2 | 5/2018 | Whitefield et al. |
| 9,960,750 | B2 | 5/2018 | Srirattana et al. |
| 10,084,224 | B2 | 9/2018 | Srirattana et al. |
| 10,128,558 | B2 | 11/2018 | Sun et al. |
| 10,164,681 | B2 | 12/2018 | Roy et al. |
| 10,249,930 | B2 | 4/2019 | Srirattana et al. |
| 10,284,167 | B2 | 5/2019 | Srirattana et al. |
| 10,403,955 | B2 | 9/2019 | Srirattana et al. |
| 10,553,925 | B2 | 2/2020 | Srirattana et al. |
| 10,707,826 | B2 | 7/2020 | Srirattana et al. |
| 10,742,189 | B2 | 8/2020 | Srirattana et al. |
| 10,763,568 | B2 | 9/2020 | Srirattana et al. |
| 2002/0097100 | A1 | 7/2002 | Woods et al. |
| 2002/0113601 | A1 | 8/2002 | Swank |
| 2002/0113666 | A1 | 8/2002 | Yamazaki et al. |
| 2002/0139975 | A1 | 10/2002 | Lewis et al. |
| 2003/0214365 | A1 | 11/2003 | Adar et al. |
| 2004/0127178 | A1 | 7/2004 | Kuffner |
| 2004/0201526 | A1 | 10/2004 | Knowles et al. |
| 2005/0017821 | A1 | 1/2005 | Sawicki |
| 2005/0040912 | A1 | 2/2005 | Pelz |
| 2005/0146394 | A1 | 7/2005 | Podell |
| 2005/0170794 | A1 | 8/2005 | Koukkari et al. |
| 2005/0239421 | A1 | 10/2005 | Kim et al. |
| 2006/0232359 | A1 | 10/2006 | Fukuda et al. |
| 2007/0082642 | A1 | 4/2007 | Hattori |
| 2007/0109072 | A1 | 5/2007 | Rai et al. |
| 2007/0159268 | A1 | 7/2007 | Podell |
| 2008/0036554 | A1 | 2/2008 | Krausse et al. |
| 2008/0055187 | A1 | 3/2008 | Tamura et al. |
| 2008/0056638 | A1 | 3/2008 | Glebov et al. |
| 2008/0070519 | A1 | 3/2008 | Okabe |
| 2008/0112466 | A1 | 5/2008 | Sasaki |
| 2009/0134953 | A1 | 5/2009 | Hunt et al. |
| 2009/0195335 | A1 | 8/2009 | Wahl et al. |
| 2009/0278624 | A1 | 11/2009 | Tsai et al. |
| 2009/0280755 | A1 | 11/2009 | Camuffo et al. |
| 2009/0322313 | A1 | 12/2009 | Zhang et al. |
| 2011/0057746 | A1 | 3/2011 | Yamamoto et al. |
| 2011/0063044 | A1 | 3/2011 | Jones |
| 2011/0148548 | A1 | 6/2011 | Uhm et al. |
| 2011/0199166 | A1 | 8/2011 | Carrillo-Ramirez |
| 2011/0254637 | A1 | 10/2011 | Manssen et al. |
| 2011/0255575 | A1 | 10/2011 | Zhu et al. |
| 2011/0279192 | A1 | 11/2011 | Nash et al. |
| 2011/0298559 | A1 | 12/2011 | Kitching et al. |
| 2012/0019332 | A1 | 1/2012 | Hino et al. |
| 2012/0019335 | A1 | 1/2012 | Hoang et al. |
| 2012/0062333 | A1 | 3/2012 | Ezzeddine et al. |
| 2012/0071123 | A1 | 3/2012 | Jones et al. |
| 2012/0195351 | A1 | 8/2012 | Banwell et al. |
| 2012/0243579 | A1 | 9/2012 | Premakanthan et al. |
| 2013/0005284 | A1 | 1/2013 | Dalipi |
| 2013/0113575 | A1 | 5/2013 | Easter |
| 2013/0194054 | A1 | 8/2013 | Presti |
| 2013/0207741 | A1 | 8/2013 | Presti |
| 2013/0241668 | A1 | 9/2013 | Tokuda et al. |
| 2013/0293316 | A1 | 11/2013 | Kitching et al. |
| 2013/0307635 | A1 | 11/2013 | Kase et al. |
| 2014/0152253 | A1 | 6/2014 | Ozaki et al. |
| 2014/0213201 | A1 | 7/2014 | Reisner et al. |
| 2014/0227982 | A1 | 8/2014 | Granger-Jones et al. |
| 2014/0266499 | A1 | 9/2014 | Noe |
| 2014/0368293 | A1 | 12/2014 | Mukaiyama |
| 2015/0002239 | A1 | 1/2015 | Tanaka |
| 2015/0042412 | A1 | 2/2015 | Imbornone et al. |
| 2015/0043669 | A1 | 2/2015 | Ella et al. |
| 2015/0048910 | A1 | 2/2015 | LaFountain et al. |
| 2015/0072632 | A1 | 3/2015 | Pourkhaatoun et al. |
| 2015/0091668 | A1 | 4/2015 | Solomko et al. |
| 2015/0200437 | A1 | 7/2015 | Solomko et al. |
| 2015/0249485 | A1 | 9/2015 | Ouyang et al. |
| 2015/0270821 | A1 | 9/2015 | Natarajan et al. |
| 2015/0326202 | A1 | 11/2015 | Nicholls et al. |
| 2015/0349742 | A1 | 12/2015 | Chen et al. |
| 2015/0372366 | A1 | 12/2015 | Frye |
| 2016/0025928 | A1 | 1/2016 | Onawa |
| 2016/0028147 | A1 | 1/2016 | Srirattana et al. |
| 2016/0028420 | A1 | 1/2016 | Srirattana et al. |
| 2016/0043458 | A1 | 2/2016 | Sun et al. |
| 2016/0065167 | A1 | 3/2016 | Granger-Jones et al. |
| 2016/0079649 | A1 | 3/2016 | Ilkov et al. |
| 2016/0079650 | A1 | 3/2016 | Solomko et al. |
| 2016/0172737 | A1 | 6/2016 | Srirattana et al. |
| 2016/0172738 | A1 | 6/2016 | Srirattana et al. |
| 2016/0172739 | A1 | 6/2016 | Srirattana et al. |
| 2016/0172740 | A1 | 6/2016 | Srirattana et al. |
| 2016/0268994 | A1 | 9/2016 | Granger-Jones et al. |
| 2016/0344430 | A1 | 11/2016 | Srirattana et al. |
| 2016/0344431 | A1 | 11/2016 | Srirattana et al. |
| 2016/0373146 | A1 | 12/2016 | Manssen et al. |
| 2017/0026020 | A1 | 1/2017 | Solomko et al. |
| 2017/0033428 | A1 | 2/2017 | Ootsuka et al. |
| 2017/0063425 | A1 | 3/2017 | Khlat et al. |
| 2017/0077966 | A1 | 3/2017 | Chen et al. |

(56) References Cited

U.S. PATENT DOCUMENTS

| | | | |
|---|---|---|---|
| 2017/0085245 A1 | 3/2017 | Srirattana et al. | |
| 2017/0141802 A1 | 5/2017 | Solomko et al. | |
| 2018/0062236 A1 * | 3/2018 | Okamoto | H01P 1/10 |
| 2019/0379099 A1 | 12/2019 | Srirattana et al. | |
| 2021/0036395 A1 * | 2/2021 | Seki et al. | H01G 4/40 |
| 2022/0359970 A1 | 11/2022 | Srinivasan et al. | |
| 2022/0359971 A1 | 11/2022 | Srinivasan et al. | |
| 2022/0393326 A1 | 12/2022 | Srirattana et al. | |

FOREIGN PATENT DOCUMENTS

| | | | |
|---|---|---|---|
| GB | 2343790 | A | 5/2000 |
| JP | S62-159502 | A | 7/1987 |
| JP | H01274502 | A | 11/1989 |
| JP | H08505750 | A | 6/1996 |
| JP | 2000-077915 | A | 3/2000 |
| JP | 2001127664 | A | 5/2001 |
| JP | 2011040978 | A | 2/2011 |
| JP | 2013126067 | A | 6/2013 |
| KR | 20040037465 | A | 5/2004 |
| KR | 20110118289 | A | 10/2011 |
| KR | 20120007790 | A | 1/2012 |
| WO | 2005018451 | A1 | 3/2005 |
| WO | 2015020927 | A2 | 2/2015 |
| WO | 2015134979 | A1 | 9/2015 |
| WO | 2017044729 | A1 | 3/2017 |

* cited by examiner

BIDIRECTIONAL RF COUPLER WITH SWITCHABLE COUPLED TRANSMISSION LINES FOR OPERATION OVER DIFFERENT FREQUENCY BANDS

CROSS-REFERENCE TO RELATED APPLICATIONS

This application claims priority under 35 U.S.C. § 119(e) to U.S. Provisional Patent Application Ser. No. 63/152,409, titled SMART BIDIRECTIONAL COUPLER WITH SWITCHABLE INDUCTORS, filed Feb. 23, 2021, which is incorporated herein by reference in its entirety for all purposes.

BACKGROUND

Technical Field

The present disclosure relates generally to bidirectional couplers. More particularly, aspects of the present disclosure relate to systems and methods for improving coupler performance using switchable inductors.

SUMMARY OF THE INVENTION

According to an aspect of the present disclosure, a radio frequency signal coupler is provided. The radio frequency signal coupler comprises an input port, an output port, a main transmission line coupled between the input port and the output port, and a coupled transmission line electromagnetically coupled to the main transmission line. The coupled transmission line includes a first transmission line, a second transmission line, and a switch configured to couple the first and second transmission lines during a first mode of operation and to decouple the first and second transmission lines during a second mode of operation.

According to an embodiment, the switch is configured to couple the first and second transmission lines during the first mode of operation to provide a first coupling factor and to decouple the first and second transmission lines during the second mode of operation to provide a second coupling factor.

According to another embodiment, the first mode of operation corresponds to a first frequency range and the second mode of operation corresponds to a second frequency range, the second frequency range being different than the first frequency range.

According to one example, the first coupling factor over the first frequency range is substantially similar to the second coupling factor over the second frequency range.

According to another example, the radio frequency signal coupler is operated in the first and second modes of operation to maintain a substantially constant insertion loss between the input port and the output port over the first and second frequency ranges.

According to a further example, the radio frequency signal coupler is configured as a bidirectional coupler and the input and output ports are each configured to receive an input radio frequency signal and provide an output radio frequency signal.

According to a further embodiment, the radio frequency signal coupler further comprises at least one forward output port and a reverse output port, the coupled transmission line being coupled between the at least one forward output port and the reverse output port.

According to one example, the at least one forward output port is configured to provide a forward coupled signal when the input radio frequency signal is received at the input port.

According to another example, the radio frequency signal coupler is operated in the first and second modes of operation to maintain a substantially constant power level of the forward coupled signal over the first and second frequency ranges.

According to a further example, the reverse output port is configured to provide a reverse coupled signal when the input radio frequency signal is received at the output port.

According to an example, the radio frequency signal coupler is operated in the first and second modes of operation to maintain a substantially constant power level of the reverse coupled signal over the first and second frequency ranges.

According to another example, the at least one forward output port and the reverse port are selectively coupled to a common output port.

According to some examples, the at least one forward output port and the reverse port are selectively coupled to an adjustable termination circuit. In accordance with these examples, an impedance value provided by the adjustable termination circuit may be adjusted based on a frequency of the input radio frequency signal.

In accordance with another embodiment, the coupled transmission line includes a third transmission line and the switch is configured to couple the third transmission line to the first transmission line and/or the second transmission line during a third mode of operation corresponding to a third frequency range, the third frequency range being different than the first and second frequency ranges. In accordance with a further embodiment, the switch is configured to couple the third transmission line to the first transmission line and/or the second transmission line during the third mode of operation to provide a third coupling factor.

According to another aspect of the present disclosure, a method for operating a radio frequency signal coupler is provided. The method comprises receiving a radio frequency signal at one of an input port and an output port, providing the radio frequency signal to a main transmission line coupled between the input port and the output port, electromagnetically coupling a portion of the radio frequency signal to a coupled transmission line, the coupled transmission line including a first transmission line and a second transmission line, and operating a switch to couple the first and second transmission lines during a first mode of operation and to decouple the first and second transmission lines during a second mode of operation.

According to an embodiment, operating the switch to couple the first and second transmission lines during the first mode of operation further includes providing a first coupling factor during the first mode of operation.

According to an example, the first coupling factor corresponds to a first frequency range.

According to an embodiment, operating the switch to decouple the first and second transmission lines during the second mode of operation further includes providing a second coupling factor during the second mode of operation.

According to an example, the second coupling factor corresponds to a second frequency range, the second frequency range being different than the first frequency range.

According to another example, the first coupling factor over the first frequency range is substantially similar to the second coupling factor over the second frequency range.

According to a further embodiment, the method further comprises operating the radio frequency signal coupler in the first and second modes of operation to maintain a substantially constant insertion loss between the input port and the output port over the first and second frequency ranges.

According to an aspect of the present disclosure, a radio frequency signal coupler is provided. The radio frequency signal coupler comprises an input port, an output port, a main inductor coupled between the input port and the output port, and a coupled inductor electromagnetically coupled to the main inductor. The coupled inductor includes a first inductor, a second inductor, and a switch configured to couple the first and second inductors during a first mode of operation and to decouple the first and second inductors during a second mode of operation.

According to an embodiment, the switch is configured to couple the first and second inductors during the first mode of operation to provide a first coupling factor and to decouple the first and second inductors during the second mode of operation to provide a second coupling factor.

According to another embodiment, the first mode of operation corresponds to a first frequency range and the second mode of operation corresponds to a second frequency range, the second frequency range being different than the first frequency range.

According to one example, the first coupling factor over the first frequency range is substantially similar to the second coupling factor over the second frequency range.

According to another example, the radio frequency coupler is operated in the first and second modes of operation to maintain a substantially constant insertion loss between the input port and the output port over the first and second frequency ranges.

According to a further example, the radio frequency signal coupler is configured as a bidirectional coupler and the input and output ports are each configured to receive an input radio frequency signal and provide an output radio frequency signal.

According to a further embodiment, the radio frequency signal coupler further comprises at least one forward output port and a reverse output port, the coupled inductor being coupled between the at least one forward output port and the reverse output port.

According to one example, the at least one forward output port is configured to provide a forward coupled signal when the input radio frequency signal is received at the input port.

According to another example, the radio frequency signal coupler is operated in the first and second modes of operation to maintain a substantially constant power level of the forward coupled signal over the first and second frequency ranges.

According to a further example, the reverse output port is configured to provide a reverse coupled signal when the input radio frequency signal is received at the output port.

According to an example, the radio frequency signal coupler is operated in the first and second modes of operation to maintain a substantially constant power level of the reverse coupled signal over the first and second frequency ranges.

According to another example, the at least one forward output port and the reverse port are selectively coupled to a common output port.

According to some examples, the at least one forward output port and the reverse port are selectively coupled to an adjustable termination circuit. In accordance with these examples, an impedance value provided by the adjustable termination circuit may be adjusted based on a frequency of the input radio frequency signal.

In accordance with another embodiment, the coupled inductor includes a third inductor and the switch is configured to couple the third inductor to the first inductor and/or the second inductor during a third mode of operation corresponding to a third frequency range, the third frequency range being different than the first and second frequency ranges. In accordance with a further embodiment, the switch is configured to couple the third inductor to the first inductor and/or the second inductor during the third mode of operation to provide a third coupling factor.

According to another aspect of the present disclosure, a method for operating a radio frequency signal coupler is provided. The method comprises receiving a radio frequency signal at one of an input port and an output port, providing the radio frequency signal to a main inductor coupled between the input port and the output port, electromagnetically coupling a portion of the radio frequency signal to a coupled inductor, the coupled inductor including a first inductor and a second inductor, and operating a switch to couple the first and second inductors during a first mode of operation and to decouple the first and second inductors during a second mode of operation.

According to an embodiment, operating the switch to couple the first and second inductors during the first mode of operation further includes providing a first coupling factor during the first mode of operation.

According to an example, the first coupling factor corresponds to a first frequency range. According to an embodiment, operating the switch to decouple the first and second inductors during the second mode of operation further includes providing a second coupling factor during the second mode of operation.

According to an example, the second coupling factor corresponds to a second frequency range, the second frequency range being different than the first frequency range.

According to another example, the first coupling factor over the first frequency range is substantially similar to the second coupling factor over the second frequency range.

According to a further embodiment, the method further comprises operating the radio frequency signal coupler in the first and second modes of operation to maintain a substantially constant insertion loss between the input port and the output port over the first and second frequency ranges.

According to a further aspect of the present disclosure, a radio frequency signal coupler is provided that includes an input port, an output port, a main inductance coupled between the input port and the output port, and a coupled inductance electromagnetically coupled to the main inductance. The coupled inductance includes a first inductance, a second inductance, and a switch configured to couple the first and second inductances during a first mode of operation and to decouple the first and second inductances during a second mode of operation.

In some examples the first inductance and the second inductance may be transmission lines, or inductors.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures and as described in the detailed description is represented by a like numeral. For purposes of clarity, not every component may be labeled in every figure. In the figures.

DETAILED DESCRIPTION OF THE INVENTION

Aspects and examples are directed to bidirectional couplers and components thereof, and to devices, modules, and systems incorporating the same.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

Figure 1:
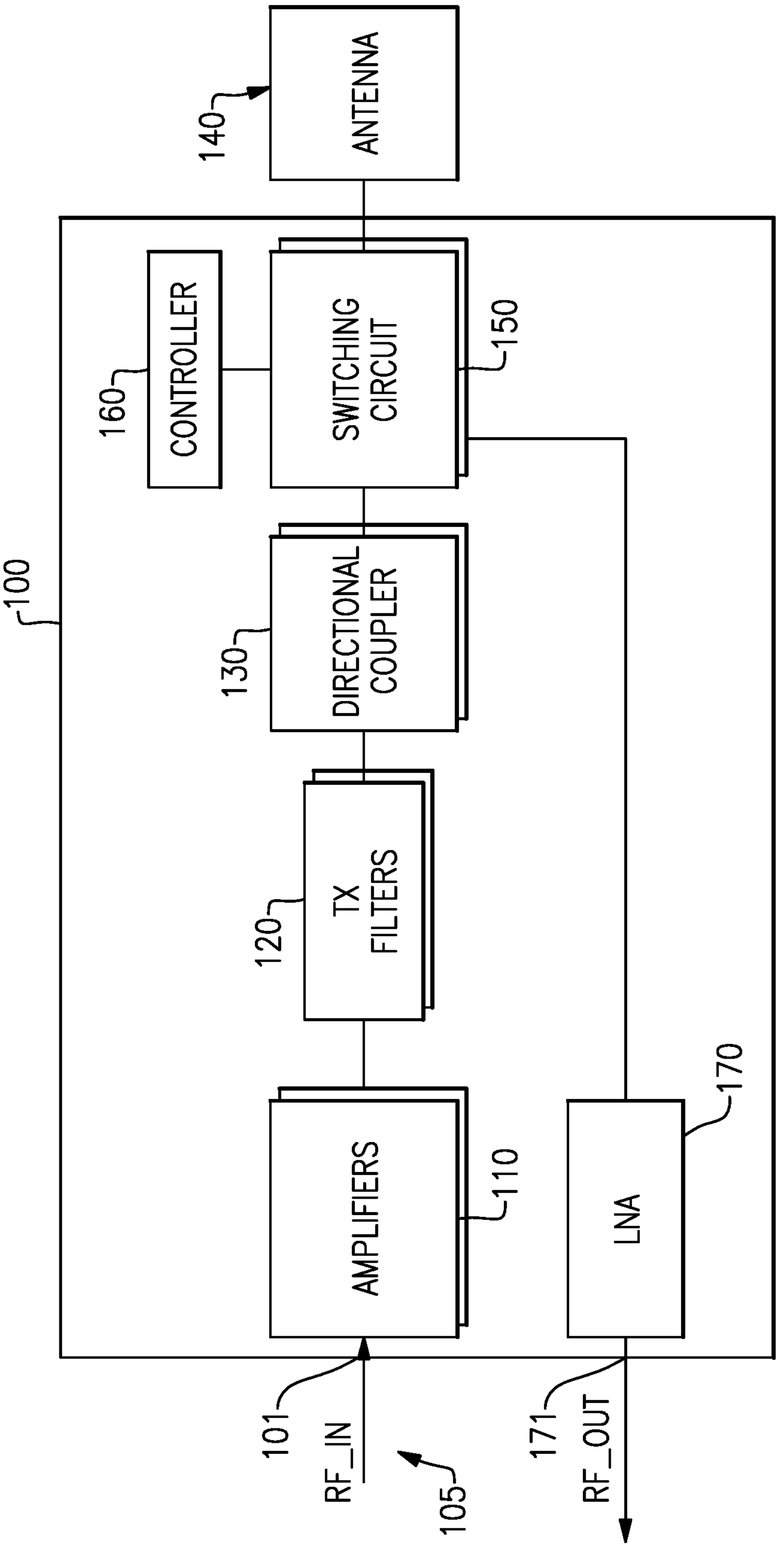
FIG. 1 is a block diagram of a front end module.

FIG. 1 is a block diagram illustrating an example of a typical arrangement of a radio-frequency (RF) "front-end" sub-system or module (FEM) 100 as may be used in a communications device, such as a mobile phone, for example, to transmit and receive RF signals. The FEM 100 shown in FIG. 1 includes a transmit (TX) path configured to provide signals to an antenna for transmission and a receive (RX) path to receive signals from the antenna. In the transmit (TX) path, a power amplifier module 110 provides gain to an RF signal 105 input (RF_IN) to the FEM 100 via an input port 101, producing an amplified RF signal. The power amplifier module 110 can include one or more Power Amplifiers (PA).

The FEM 100 can further include a filtering subsystem or module 120, which can include one or more filters. A directional coupler 130 can be used to extract a portion of the power from the RF signal traveling between the power amplifier module 110 and an antenna 140 connected to the FEM 100. The antenna 140 can transmit the RF signal and can also receive RF signals. A switching circuit 150, also referred to as an Antenna Switch Module (ASM), can be used to switch between a transmitting mode and receiving mode of the FEM 100, for example, or between different transmit or receive frequency bands. In certain examples, the switching circuit 150 can be operated under the control of a controller 160. As shown, the directional coupler 130 can be positioned between the filtering subsystem 120 and the switching circuit 150. In other examples, the directional coupler 130 may be positioned between the power amplifier module 110 and the filtering subsystem 120, or between the switching circuit 150 and the antenna 140.

The FEM 100 can also include a receive (RX) path configured to process signals received by the antenna 140 and provide the received signals in signal output (RF_OUT) to a signal processor (e.g., a transceiver) via an output port 171. The receive (RX) path can include one or more Low-Noise Amplifiers (LNA) 170 to amplify the signals received from the antenna. Although not shown, the receive (RX) path can also include one or more filters for filtering the received signals.

As described above, directional couplers (e.g., directional coupler 130) can be used in front end module (FEM) products, such as radio transceivers, wireless handsets, and the like. For example, directional couplers can be used to detect and monitor RF output power. When an RF signal generated by an RF source is provided to a load, such as to an antenna, a portion of the RF signal can be reflected from the load back toward the RF source. An RF coupler can be included in a signal path between the RF source and the load to provide an indication of forward RF power of the RF signal traveling from the RF source to the load and/or an indication of reverse RF power reflected from the load. RF couplers include, for example, directional couplers, bidirectional couplers, multi-band couplers (e.g., dual band couplers), and the like.

Figure 2:
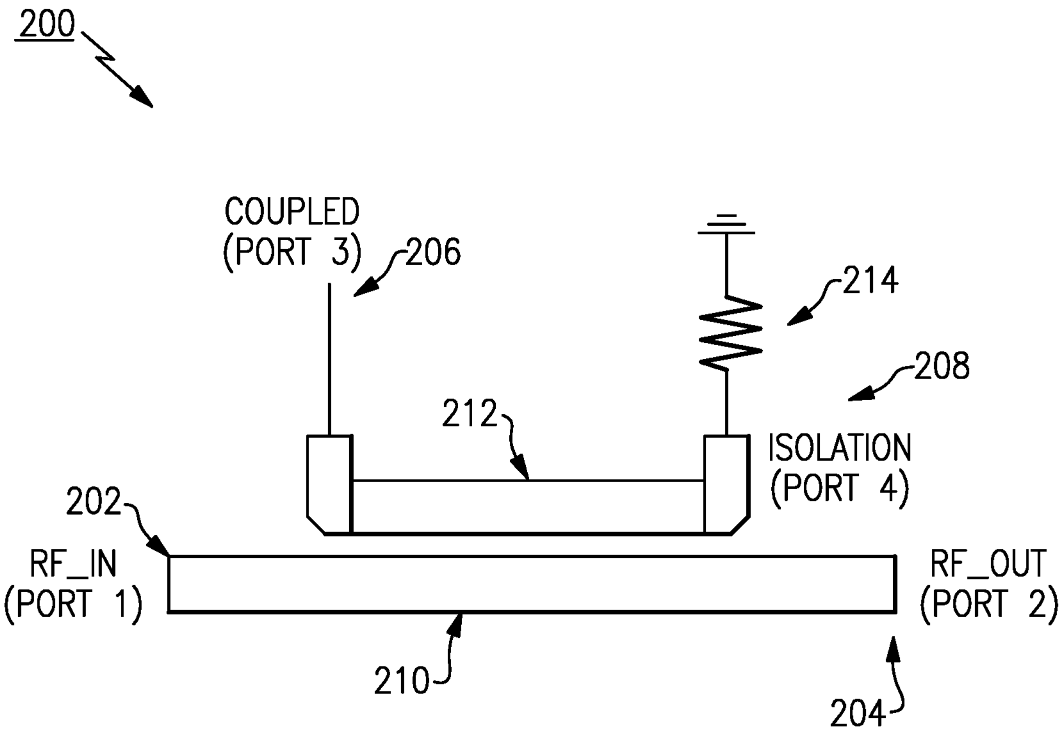
FIG. 2 is a schematic diagram of a radio frequency coupler.

Referring to FIG. 2, an RF coupler 200 typically has a power input (RF_IN) port (PORT 1) 202, a power output (RF_OUT) port (PORT 2) 204, a coupled port (PORT 3) 206, and an isolation port (PORT 4) 208. The electromagnetic coupling mechanism, which can include inductive or capacitive coupling, is typically provided by two parallel or overlapped transmission lines, such as microstrips, strip lines, coplanar lines, and the like. The transmission line 210 extending between the power input port 202 and the power output port 204 is termed the "main line" and can provide the majority of the signal from the power input port 202 to the power output port 204. The transmission line 212 extending between the coupled port 206 and the isolation port 208 is termed the "coupled line" and can be used to extract a portion of the power traveling between the power input port 202 and the power output port 204 for measurement. In some examples, the amount of inductance provided by each of the transmission lines 210, 212 corresponds to the length of each transmission line. In certain examples, inductor coils may be used in place of the transmission lines 210, 212.

When a termination impedance 214 is presented to the isolation port 208 (as shown in FIG. 2), an indication of forward RF power traveling from the power input port 202 to the power output port 204 is provided at the coupled port 206. Similarly, when a termination impedance is presented to the coupled port 206, an indication of reverse RF power traveling from the power output port 204 to the power input port 202 is provided at the coupled port 206, which is now effectively the isolation port for reverse RF power. The termination impedance 214 is typically implemented by a 50 Ohm shunt resistor in a variety of conventional RF couplers; however, in other examples, the termination impedance 214 may provide a different impedance value for a specific frequency of operation. In some examples, the termination impedance 214 may be adjustable to support multiple frequencies of operation.

In one example, the RF coupler 200 is configured to provide a coupling factor corresponding to the mutual coupling of the transmission line 210 (or first inductor coil) to the transmission line 212 (or second inductor coil) and the capacitive coupling of the transmission line 210 (or first inductor coil) to the transmission line 212 (or second inductor coil). In some examples, the coupling factor may be a function of the spacing between the transmission lines 210, 212 and the inductance of the transmission lines 210, 212. In many cases, the coupling factor increases as frequency increases. As the coupling factor increases, more power is coupled from the main line (i.e., transmission line 210) to the coupled line (i.e., transmission line 212), increasing the insertion loss of the RF coupler 200.

As such, RF couplers are typically designed to achieve a desired coupling factor at a specific frequency (or band). However, in some cases, RF couplers may be bidirectional and configured for use in multi-mode, multi-frequency applications. For example, an RF coupler may be included in a FEM configured to operate in a first mode of operation and a second mode of operation (e.g., the FEM 100 of FIG. 1). In one example, the first mode of operation may correspond to low frequency signals (e.g., 1 GHZ) and the second mode of operation may correspond to high frequency signals (e.g., 3 GHZ). In some examples, the RF coupler may be designed to achieve a desired coupling factor during the first mode of operation and the coupling factor may be stronger than intended or desired during the second mode of operation. As such, an attenuator may be used to reduce the coupled power during the second mode of operation. Likewise, the insertion loss of the RF coupler may increase during the second mode of operation and the output power of the power amplifier module 110 (or another RF source) may be increased during the second mode of operation to compensate for the increased insertion loss.

In some examples, the inclusion of an attenuator to reduce the coupled power during the second mode of operation (i.e., high frequency mode) can increase the footprint of the RF coupler and the overall package size of the FEM. In addition, by attenuating the coupled power during the second mode of operation, the accuracy of the output power monitoring provided by the RF coupler may be reduced. For example, the attenuation provided by the attenuator may not compensate the exact amount of excess power corresponding to the increased coupling factor and the exact value of attenuation provided the attenuator may vary. Likewise, a bypass switch may be needed to bypass the attenuator during the first mode of operation (i.e., low frequency mode). Besides occupying extra space, the bypass switch may provide additional loss in the coupled power signal path. In addition, operating the power amplifier module 110 (or another RF source) to provide higher output power during the second mode of operation may reduce the efficiency of the power amplifier module 110 and increase the power consumption of the FEM 100.

Alternatively, to support the first and second modes of operation, the FEM 100 can be configured to include separate RF couplers for each mode. For example, the FEM 100 may include a first RF coupler designed to achieve a desired coupling factor during the first mode of operation and a second RF coupler designed to achieve a desired coupling factor during the second mode of operation. However, the inclusion of separate RF couplers may increase the footprint and/or package size of the FEM 100. In addition, the switching circuitry needed to switch between the RF couplers may also increase footprint and/or package size of the FEM 100 any may introduce additional loss in the signal paths.

Figure 3:
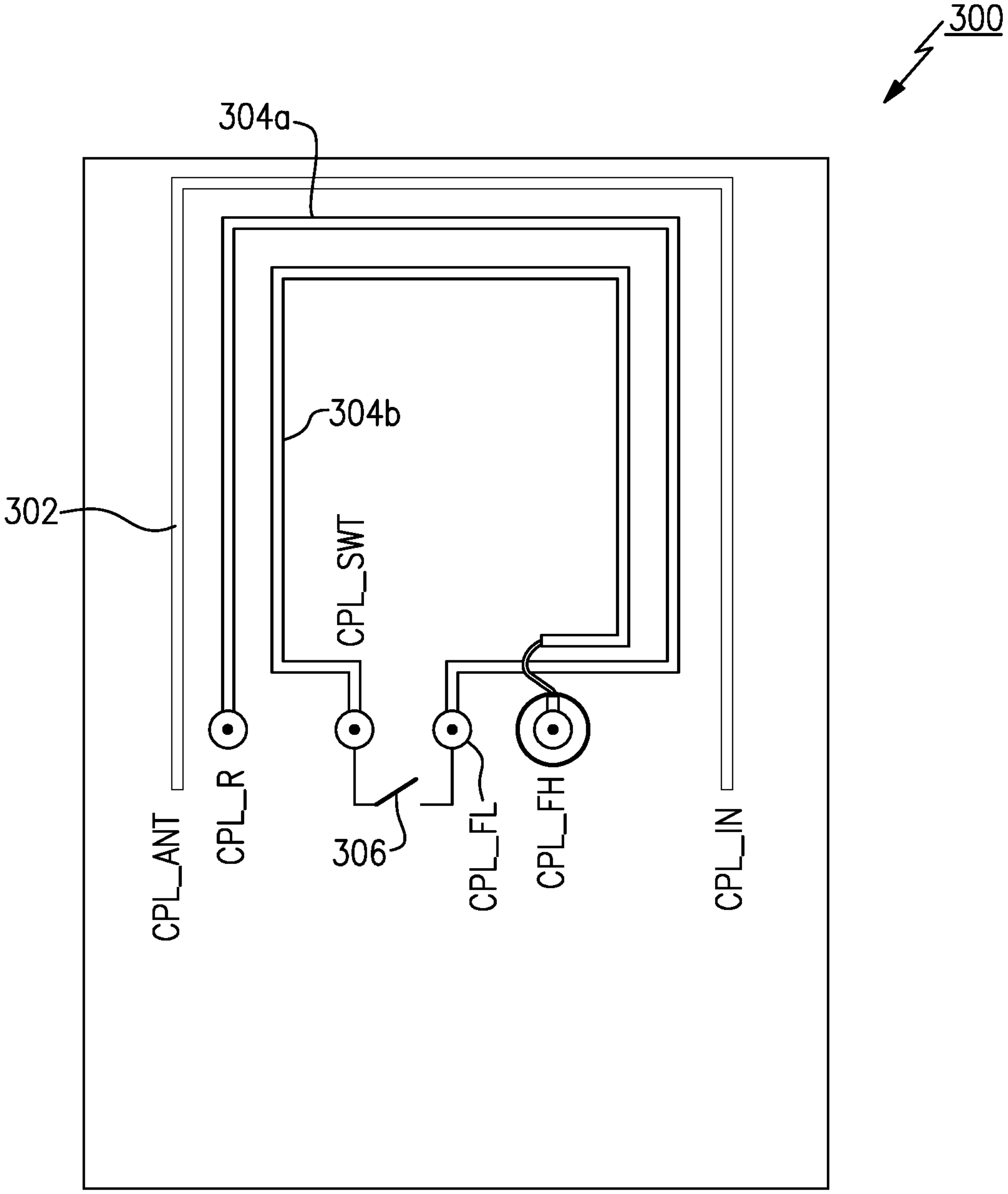
FIG. 3 is a schematic diagram of a radio frequency coupler in accordance with aspects described herein.

As such, an improved bidirectional coupler is provided herein. In at least one embodiment, the bidirectional coupler includes switchable inductors configured to provide an adjustable coupling factor. In some examples, the bidirectional coupler is configured to support a range of signal frequencies. In certain examples, the coupling factor is adjusted to maintain a substantially constant coupled power level while minimizing insertion loss over the range of signal frequencies. FIG. 3 illustrates a schematic diagram of a bidirectional coupler 300 in accordance with aspects described herein. As shown, the coupler 300 includes a main transmission line 302, a coupled transmission line, and a switch 306. In one example, the coupled transmission line includes a first segment 304*a* and a second segment 304*b*. In some examples, the first and second segments 304*a*, 304*b* are transmission lines corresponding to switchable inductors. The switch 306 is operated to selectively couple the first segment 304*a* to the second segment 304*b* to change the length (i.e., inductance) of the coupled transmission line.

In one example, the main transmission line 302 includes a first port (CPL_IN) and a second port (CPL_ANT) and the coupled transmission line includes a first forward port (CPL_FL), a second forward port (CPL_FH), and a reverse port (CPL_R). In some examples, the first port (CPL_IN) of the main transmission line 302 is configured to be coupled to the output of a filter or amplifier of a FEM (e.g., the filtering subsystem 120 or power amplifier module 110 of the FEM 100 as shown in FIG. 1). Likewise, the second port (CPL_ANT) of the main transmission line 302 may be configured to be coupled to the input of a switch/antenna port of a FEM (e.g., the switching circuit 150 or a port connected to the antenna 140 of the FEM 100).

In some examples, when a radio frequency signal is applied to the first port (CPL_IN) of the main transmission line 302, the signal is output via the second port (CPL_ANT) of the main transmission line 302 and a coupled signal is provided to the first or second forward ports (CPL_FL, CPL_FH) of the coupled transmission line. Similarly, when a radio frequency signal is applied to the second port (CPL_ANT) of the main transmission line 302, the signal is output via the first port (CPL_IN) of the main transmission line 302 and a coupled signal is provided to the reverse port (CPL_R) of the coupled transmission line.

As described above, the switch 306 may be operated to selectively couple the first and second segments 304*a*, 304*b* of the coupled transmission line to change the length (i.e., inductance) of the coupled transmission line. In one example, to couple the first and second segments 304*a*, 304*b* of the coupled transmission line, the switch 306 is configured to selectively couple the first forward port (CPL_FL) of the first segment 304*a* to the switch port (CPL_SWT) of the second segment 304*b*. As such, the coupler 300 may be configured to operate in different modes of operation corresponding to the state of the switch 306. For example, in a first mode of operation, the switch 306 may be turned on (i.e., closed) to couple the first segment 304*a* of the coupled transmission line to the second segment 304*b* of the coupled transmission line 304. Likewise, in a second mode of operation, the switch 306 may be turned off (i.e., opened) to decouple the first segment 304*a* of the coupled transmission line from the second segment 304*b* of the coupled transmission line.

Figure 4B:
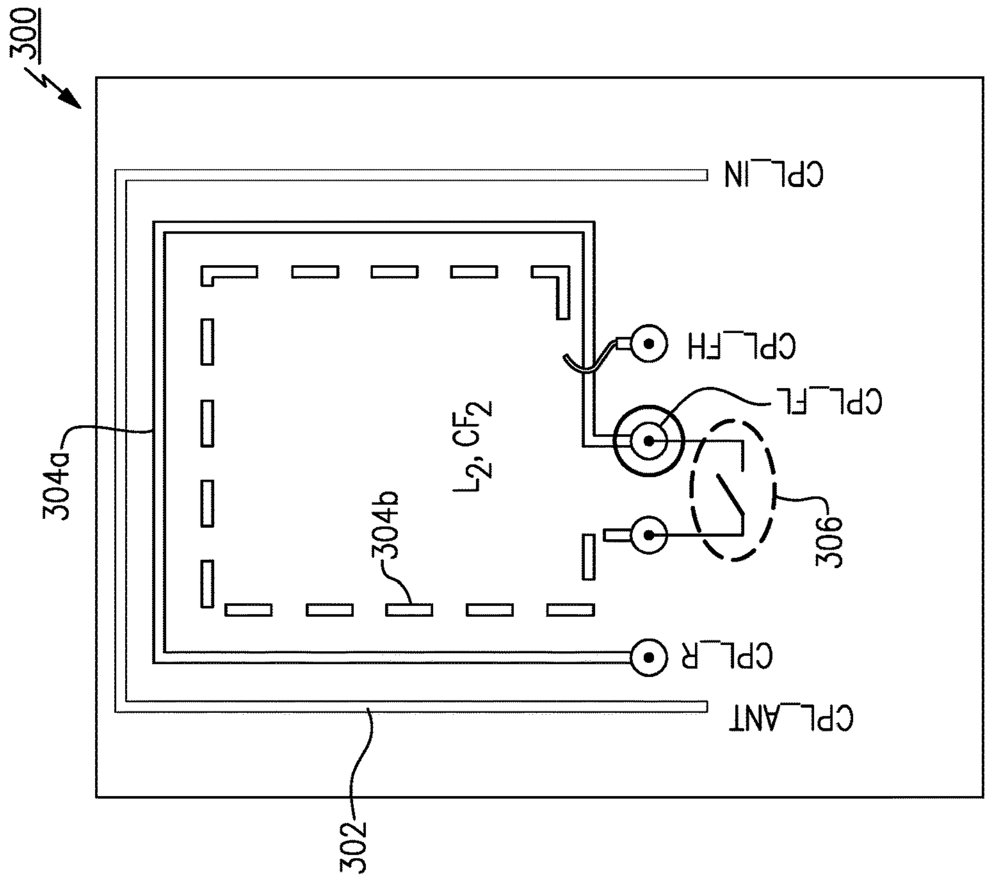
FIG. 4B is a schematic diagram of a radio frequency coupler operating in a second mode of operation in accordance with aspects described herein.
Figure 4A:
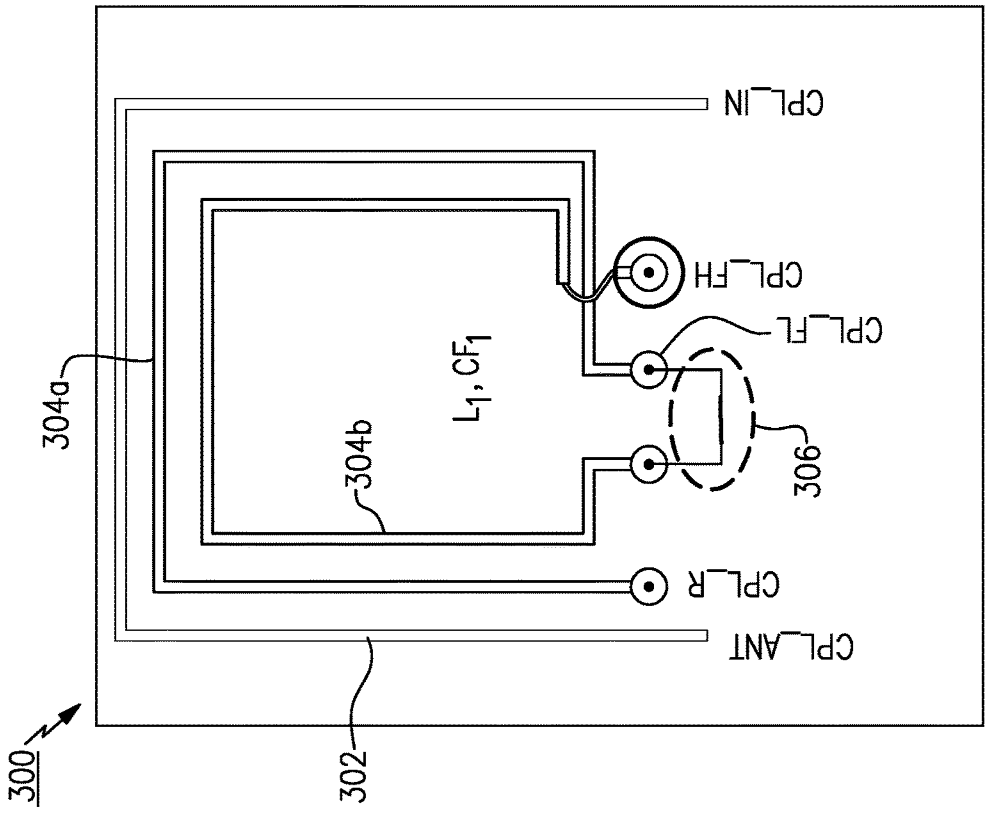
FIG. 4A is a schematic diagram of a radio frequency coupler operating in a first mode of operation in accordance with aspects described herein.

FIGS. 4A and 4B are schematic diagrams of the bidirectional coupler 300 operating in the first and second modes of operation in accordance with aspects described herein. As shown in FIG. 4A, in the first mode of operation, the switch 306 is turned on (i.e., closed) to couple the first and second segments 304*a*, 304*b* of the coupled transmission line. In one example, when the first and second segments 304*a*, 304*b* are coupled together, the coupled transmission line has a first length $L_1$ and the coupler 300 has a first coupling factor $CF_1$ corresponding to the first length $L_1$. In some examples, the first length $L_1$ of the coupled transmission line corresponds to the combined length of the first and second segments 304*a*, 304*b* of the coupled transmission line. As such, when a radio frequency signal is applied to the first port (CPL_IN) of the main transmission line 302, a coupled signal is provided to the second forward port (CPL_FH) of the coupled transmission line via the first and second segments 304*a*, 304*b* of the coupled transmission line. Likewise, when a radio frequency signal is applied to the second port (CPL_ANT) of the main transmission line 302, a coupled signal is provided to the reverse port (CPL_R) of the coupled transmission line via the first and second segments 304*a*, 304*b* of the coupled transmission line.

Similarly, as shown in FIG. 4B, in the second mode of operation, the switch 306 is turned off (i.e., opened) to decouple the first and second segments 304*a*, 304*b* of the coupled transmission line. In one example, when the first and second segments 304*a*, 304*b* are decoupled, the coupled transmission line has a second length $L_2$ and the coupler 300 has a second coupling factor CF2 corresponding to the second length $L_2$. In some examples, the second length $L_2$ of the coupled transmission line corresponds to the length of the first segment 304*a* of the coupled transmission line. As such, when a radio frequency signal is applied to the first port (CPL_IN) of the main transmission line 302, a coupled signal is provided to the first forward port (CPL_FL) of the coupled transmission line via the first segment 304*a* of the coupled transmission line. Likewise, when a radio frequency signal is applied to the second port (CPL_ANT) of the main transmission line 302, a coupled signal is provided to the reverse port (CPL_R) of the coupled transmission line via the first segment 304*a* of the coupled transmission line.

As described above, the length of the coupled transmission line during the first mode of operation (i.e., $L_1$ with respect to FIG. 4A) is longer than the length of the coupled transmission line during the second mode of operation (i.e., $L_2$ with respect to FIG. 4B). As such, the coupling factor of the coupler 300 during the first mode of operation (i.e., $CF_1$ with respect to FIG. 4A) is larger than the coupling factor of the coupler 300 during the second mode of operation (i.e., CF2 with respect to FIG. 4B). Being that the coupling factor increases with frequency, the coupler 300 may switch between the first and second modes of operation based on the frequency of the signal applied to the main transmission line 302 to minimize insertion loss. For example, for lower frequency signals, the coupler 300 may operate in the first mode of operation (i.e., larger coupling factor $CF_1$). Likewise, for higher frequency signals, the coupler 300 may operate in the second mode of operation (i.e., smaller coupling factor CF2).

Figure 5:
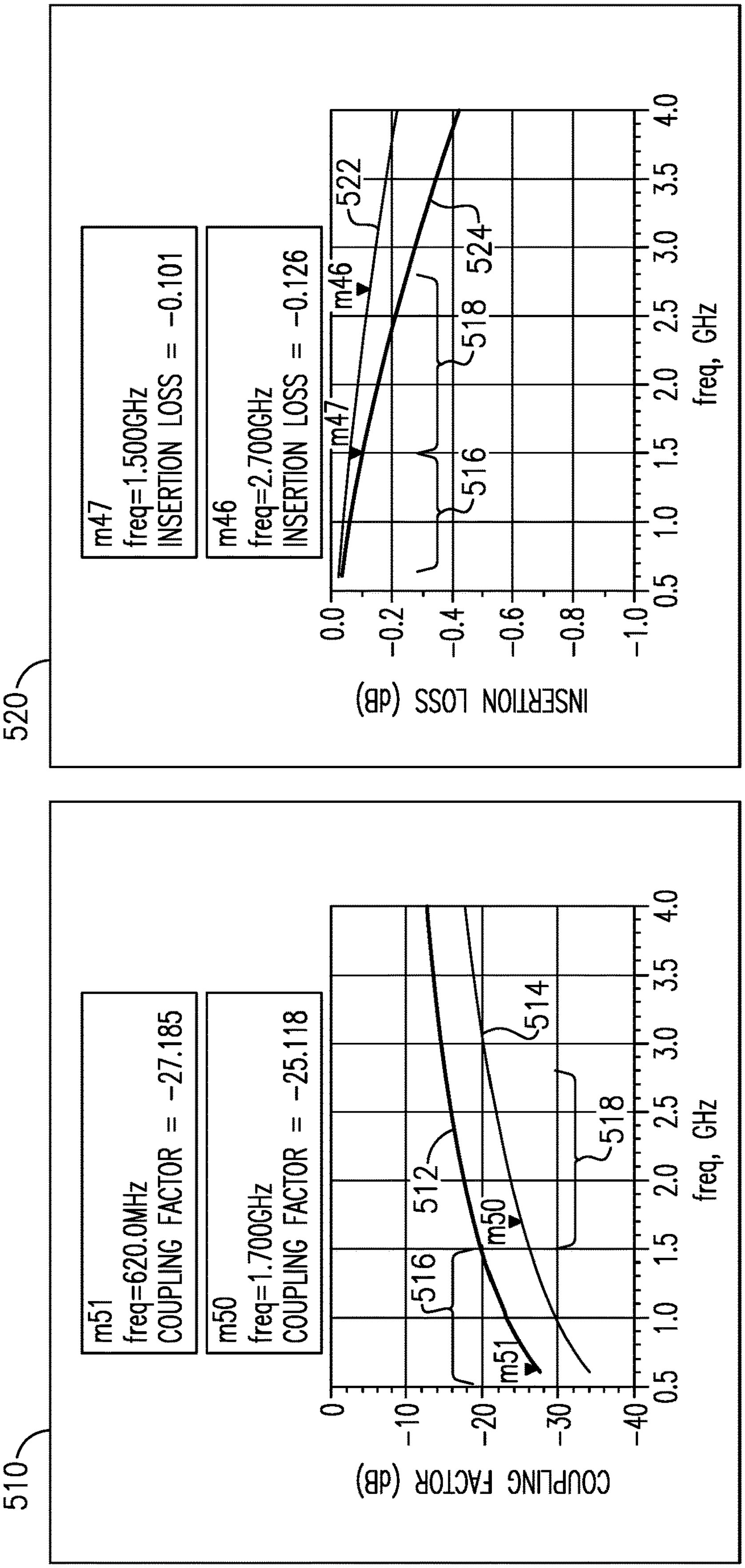
FIG. 5 is a set of graphs illustrating performance of a radio frequency coupler in accordance with aspects described herein.

FIG. 5 illustrates several graphs of simulated performance results of a bidirectional coupler in accordance with aspects described herein. In one example, graph 510 includes the coupling factor (in dB) of the bidirectional coupler 300 over frequency (in GHZ) and graph 520 includes the insertion loss (in dB) of the bidirectional coupler 300 over frequency (in GHz).

In one example, the first trace 512 (including marker m51 at a frequency of 620.0 MHz and a coupling factor of −27.185) in graph 510 represents the coupling factor of the coupler 300 while operating in the first mode of operation (i.e., $CF_1$ with respect to FIG. 4A). Likewise, the second trace 514 (including marker m50 at a frequency of 1.700 GHz and a coupling factor of −25.118) in graph 510 represents the coupling factor of the coupler 300 while operating in the second mode of operation (i.e., $CF_2$ with respect to FIG. 4B). As shown, due to the length of the coupled transmission line, the first coupling factor $CF_1$ remains larger than the second coupling factor $CF_2$ over the entire frequency (freq) sweep of 0.5 GHz to 4 GHZ. As described above, the coupler 300 may be operated in the first and second modes of operation based on frequency. In one example, the coupler 300 may be operated in the first mode of operation for a first frequency range 516 (about 0.5 GHz to 1.5 GHZ) and in the second mode of operation for a second frequency range 518 (about 1.5 GHz to 2.75 GHZ). By switching between the first and second modes of operation based on frequency, the coupler 300 may provide a substantially constant coupling factor over the frequency ranges 516, 518. For example, the coupler 300 may provide a coupling factor of approximately −27.1 dB at approximately 0.6 GHZ (i.e., the first frequency range 516) while operating in the first mode of operation and a coupling factor of approximately −25.1 dB at approximately 1.7 GHZ (i.e., the second frequency range 518) while operating in the second mode of operation. In certain examples, the coupler 300 may provide a coupling factor that varies by less than +3 dB over the entire operational frequency range (e.g., 0.5 GHZ to 3 GHZ). In some examples, the substantially constant coupling factor allows the coupler 300 to provide coupled power to the forward and reverse ports (CPL_FL, CPL_FH, CPL_R with respect to FIG. 3) of the coupled transmission line at a substantially constant power level over frequency.

In one example, the first trace 522 (including marker m46 at a frequency of 2.700 GHz and an insertion loss of −0.126) in graph 520 represents the insertion loss of the coupler 300 while operating in the first mode of operation (i.e., $CF_1$) and the second trace 524 (including marker m47 at a frequency of 1.500 GHz and an insertion loss of −0.101) represents the insertion loss of the coupler 300 while operating in the second mode of operation (i.e., $CF_2$). In some examples, by maintaining a substantially constant coupling factor over frequency, the insertion loss of the coupler 300 can be minimized. For example, the coupler 300 may have an insertion loss of approximately −0.10 dB at approximately 1.5 GHZ (i.e., a frequency within the first frequency range 516) while operating in the first mode of operation and an insertion loss of approximately −0.12 dB at approximately 2.7 GHZ (i.e., a different frequency within the second frequency range 518) while operating in the second mode of operation. In certain examples, the insertion loss of the coupler 300 may be less than −0.15 dB over the entire operational frequency range (e.g., 0.5 GHz to 3 GHZ). In some examples, by minimizing insertion loss over frequency, radio frequency signals can be applied to the first and second ports (CPL_IN, CPL_ANT with respect to FIG. 3) of the main transmission line 302 with substantially constant power levels over frequency. In addition, return loss in the main transmission line 302 may remain substantially unchanged when switching between the first and second modes of operation.

Figure 6:
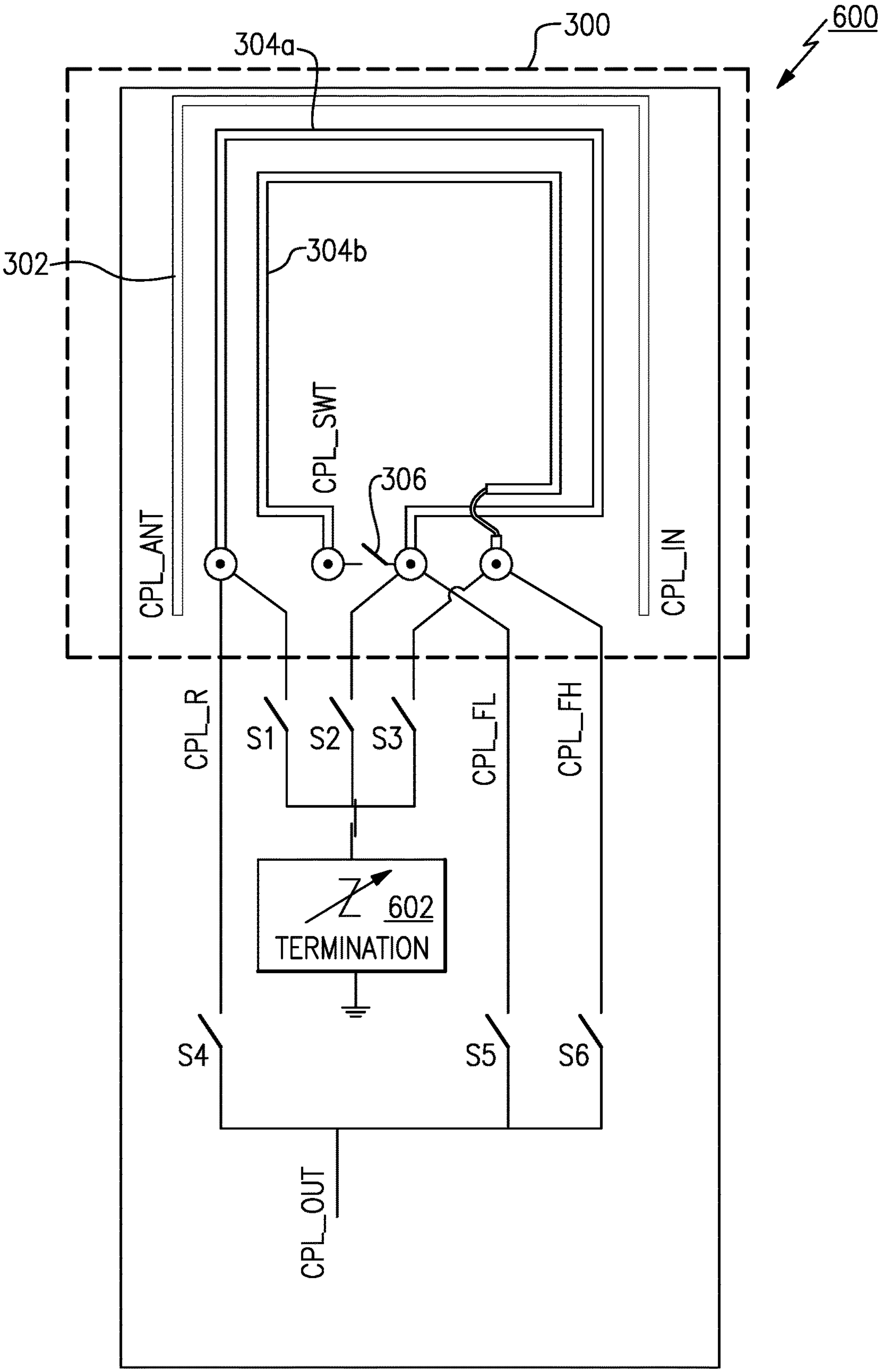
FIG. 6 is a schematic diagram of a radio frequency coupler arrangement in accordance with aspects described herein.

As described above, the coupling factor of the coupler 300 can be adjusted to minimize insertion loss over frequency while maintaining a substantially constant power level of the coupled signal provided to the forward and reverse output ports (CPL_FL, CPL_FH, and CPL_R). As such, the coupler 300 may be integrated in devices (e.g., the FEM 100) without using extra components (e.g., attenuators) to regulate the power level of the coupled signal. Likewise, the RF source providing the input signal to the coupler 300 (e.g., the power amplifier module 110) can be operated at a constant output power level over frequency, improving the efficiency of the power amplifier module 110 and/or the power consumption of the FEM 100. In addition, the compact footprint of the coupler 300 may allow the footprint or package size of the FEM 100 to be reduced. In some examples, the bidirectional coupler 300 may be arranged with additional components to support multi-mode operation (e.g. adjustable termination components). Likewise, the coupler 300 may be arranged with additional components to support integration into existing FEM architectures and layouts. FIG. 6 illustrates a bidirectional coupler arrangement 600 in accordance with aspects described herein. In one example, the coupler arrangement 600 includes the bidirectional coupler 300, an adjustable termination circuit 602, and a plurality of switches S1, S2, S3, S4, S5, and S6.

As described above, the coupler 300 includes the main transmission line 302 having the first port (CPL_IN) and the second port (CPL_ANT), the coupled transmission line having the first forward port (CPL_FL), the second forward port (CPL_FH), and the reverse port (CPL_R), and the switch 306 that is configured to selectivity couple the first and second segments 304*a*, 304*b* of the coupled transmission line.

In one example, the first switch S1 is configured to selectively couple the reverse port (CPL_R) of the coupled transmission line to the adjustable termination circuit 602, the second switch S2 is configured to selectively couple the first forward port (CPL_FL) of the coupled transmission line to the adjustable termination circuit 602, and the third switch S3 is configured to selectively couple the second forward port (CPL_FH) of the coupled transmission line to the adjustable termination circuit 602. Likewise, the fourth switch S4 is configured to selectively couple the reverse port (CPL_R) of the coupled transmission line to the common output (CPL_OUT), the fifth switch S5 is configured to selectively couple the first forward port (CPL_FL) of the coupled transmission line to the common output (CPL_OUT), and the sixth switch S6 is configured to selectively couple the second forward port (CPL_FH) of the coupled transmission line to the common output (CPL_OUT).

In some examples, the adjustable termination circuit 602 is selectively coupled to the ports of the coupler 300 to control the directivity of the coupler. For example, the adjustable termination circuit 602 may be coupled to the port that corresponds to the isolation port in each mode of operation of the coupler 300. In one example, when the coupler 300 is providing forward coupling, the adjustable termination circuit 602 may be coupled to the reverse port (CPL_R) of the coupled transmission line. Likewise, when the coupler 300 is providing reverse coupling, the adjustable termination circuit 602 may be coupled to one of the forward ports (CPL_FL, CPL_FH) of the coupled transmission line. In one example, the adjustable termination circuit 602 includes at least one adjustable/tunable RLC (resistive-inductive-capacitive) circuit that includes one or more tunable resistive, inductive, or capacitive elements, or a combination thereof. In some examples, the adjustable termination circuit 602 is adjusted/tuned based on the mode of operation of the coupler 300. For example, during the first mode of operation, the adjustable termination circuit 602 may be adjusted to provide a first termination impedance optimized for lower frequency signals (e.g., the first frequency range 516 with respect to FIG. 5). Likewise, during the second mode of operation, the adjustable termination circuit 602 may be adjusted to provide a second termination impedance optimized for higher frequency signals (e.g., the second frequency range 518 with respect to FIG. 5). In certain examples, the adjustable termination circuit 602 may be adjusted to provide termination impedances for specific signal frequencies.

In some examples, the coupling factor of the coupler 300 may be adjusted to account for losses associated with the switches S1-S6. For example, the width and/or length of the first and second segments 304*a*, 304*b* of the coupled transmission line may be adjusted to increase or decrease the coupling factor of the coupler 300. In certain examples, the spacing between the main transmission line 302 and the coupled transmission line may be adjusted to increase or decrease the coupling factor of the coupler 300.

FIGS. 7A-7D are schematic diagrams of the bidirectional coupler arrangement 600 operating in various states in accordance with aspects described herein.

Figure 7A:
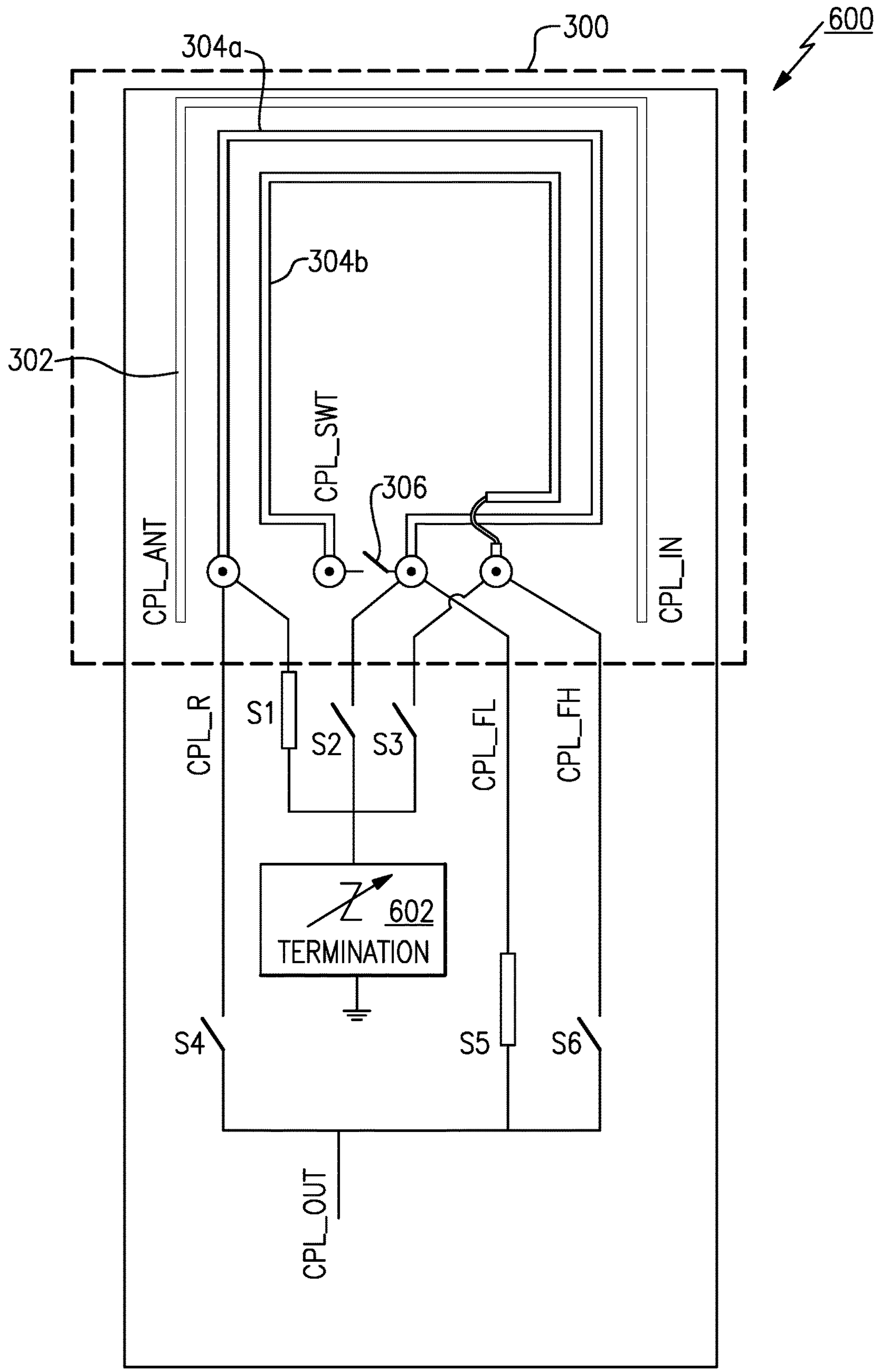
FIG. 7A is a schematic diagram of a radio frequency coupler arrangement operating in a first state in accordance with aspects described herein.

FIG. 7A illustrates a first state of the bidirectional coupler arrangement 600. In one example, the first state corresponds to a weak coupling in the forward direction. In some examples, the bidirectional coupler arrangement 600 may operate in the first state to provide forward coupling for higher frequency signals (e.g., the second frequency range 518 with respect to FIG. 5). As shown, the coupler 300 is operated in the second mode of operation and the switch 306 is turned off (i.e., opened) to decouple the first and second segments 304*a*, 304*b* of the coupled transmission line. As such, when a radio frequency signal is applied to the first port (CPL_IN) of the main transmission line 302, a coupled signal is provided to the first forward port (CPL_FL) of the coupled transmission line via the first segment 304*a* of the coupled transmission line 304. In one example, the fifth switch S5 is turned on (i.e., closed) to direct the coupled signal from the first forward port (CPL_FL) to the common output port (CPL_OUT). In addition, the first switch S1 is turned on (i.e., closed) to couple the reverse port (CPL_R) of the coupled transmission line to the adjustable termination circuit 602. Being that the coupler 300 is operating in the second mode of operation, the adjustable termination circuit 602 may be configured to provide the second termination impedance optimized for higher frequency signals during the first state of the coupler arrangement 600.

Figure 7B:
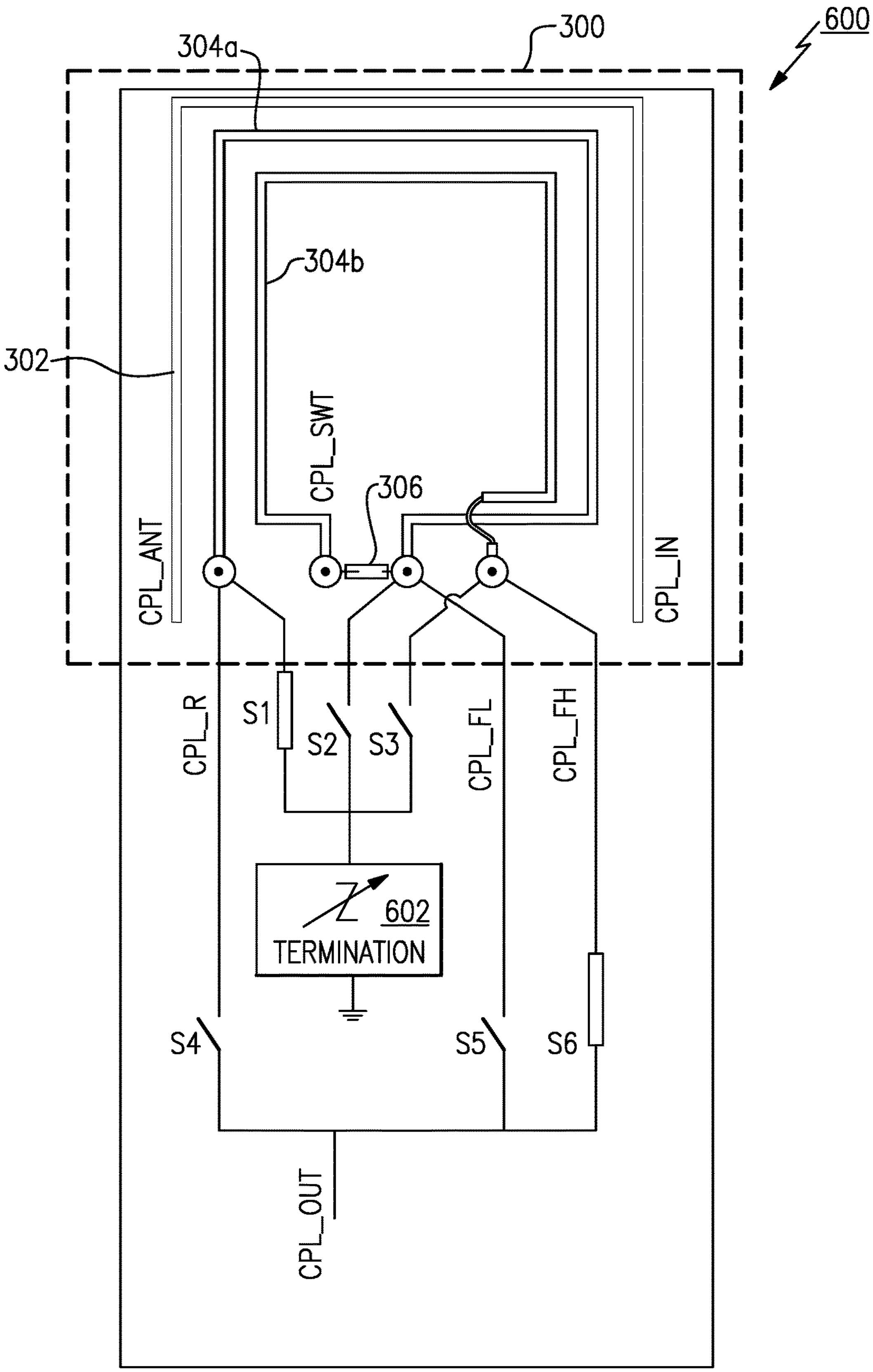
FIG. 7B is a schematic diagram of a radio frequency coupler arrangement operating in a second state in accordance with aspects described herein.

FIG. 7B illustrates a second state of the bidirectional coupler arrangement 600. In one example, the second state corresponds to a strong coupling in the forward direction. In some examples, the bidirectional coupler arrangement 600 may operate in the second state to provide forward coupling for lower frequency signals (e.g., the first frequency range 516 with respect to FIG. 5). As shown, the coupler 300 is operated in the first mode of operation and the switch 306 is turned on (i.e., closed) to couple the first and second segments 304*a*, 304*b* of the coupled transmission line. As such, when a radio frequency signal is applied to the first port (CPL_IN) of the main transmission line 302, a coupled signal is provided to the second forward port (CPL_FH) of the coupled transmission line via the first and second segments 304*a*, 304*b* of the coupled transmission line. In one example, the sixth switch S6 is turned on (i.e., closed) to direct the coupled signal from the second forward port (CPL_FH) to the common output port (CPL_OUT). In addition, the first switch S1 is turned on (i.e., closed) to couple the reverse port (CPL_R) of the coupled transmission line to the adjustable termination circuit 602. Being that the coupler 300 is operating in the first mode of operation, the adjustable termination circuit 602 may be configured to provide the first termination impedance optimized for lower frequency signals during the second state of the coupler arrangement 600.

Figure 7C:
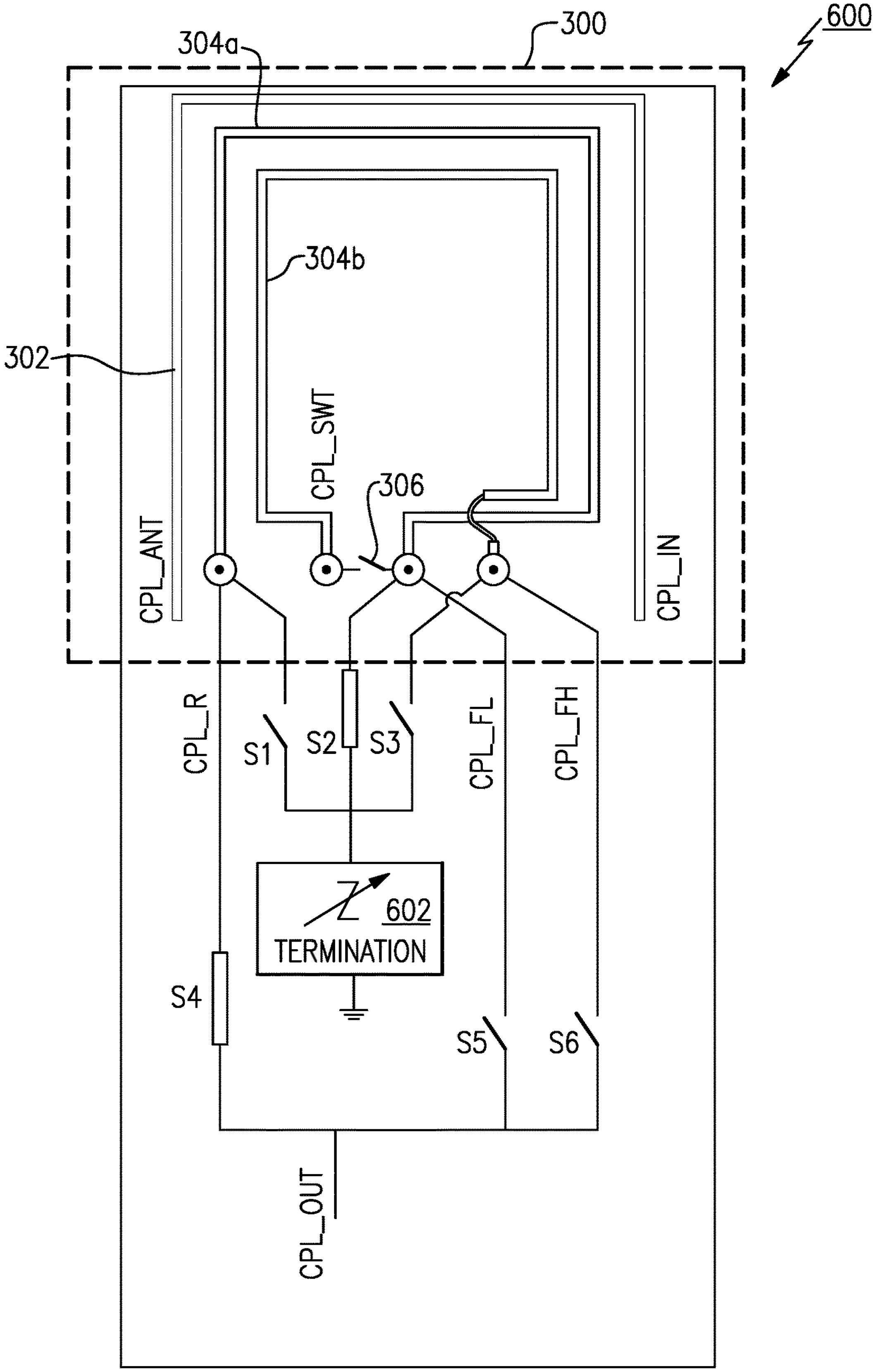
FIG. 7C is a schematic diagram of a radio frequency coupler arrangement operating in a third state in accordance with aspects described herein.

FIG. 7C illustrates a third state of the bidirectional coupler arrangement 600. In one example, the third state corresponds to a weak coupling in the reverse direction. In some examples, the bidirectional coupler arrangement 600 may operate in the third state to provide reverse coupling for higher frequency signals (e.g., the second frequency range 518 with respect to FIG. 5). As shown, the coupler 300 is operated in the second mode of operation and the switch 306 is turned off (i.e., opened) to decouple the first and second segments 304*a*, 304*b* of the coupled transmission line. As such, when a radio frequency signal is applied to the second port (CPL_ANT) of the main transmission line 302, a coupled signal is provided to the reverse port (CPL_R) of the coupled transmission line via the first segment 304*a* of the coupled transmission line. In one example, the fourth switch S4 is turned on (i.e., closed) to direct the coupled signal from the reverse port (CPL_R) to the common output port (CPL_OUT). In addition, the second switch S2 is turned on (i.e., closed) to couple the first forward port (CPL_FL) of the coupled transmission line to the adjustable termination circuit 602. Being that the coupler 300 is operating in the second mode of operation, the adjustable termination circuit 602 may be configured to provide the second termination impedance optimized for higher frequency signals during the third state of the coupler arrangement 600.

Figure 7D:
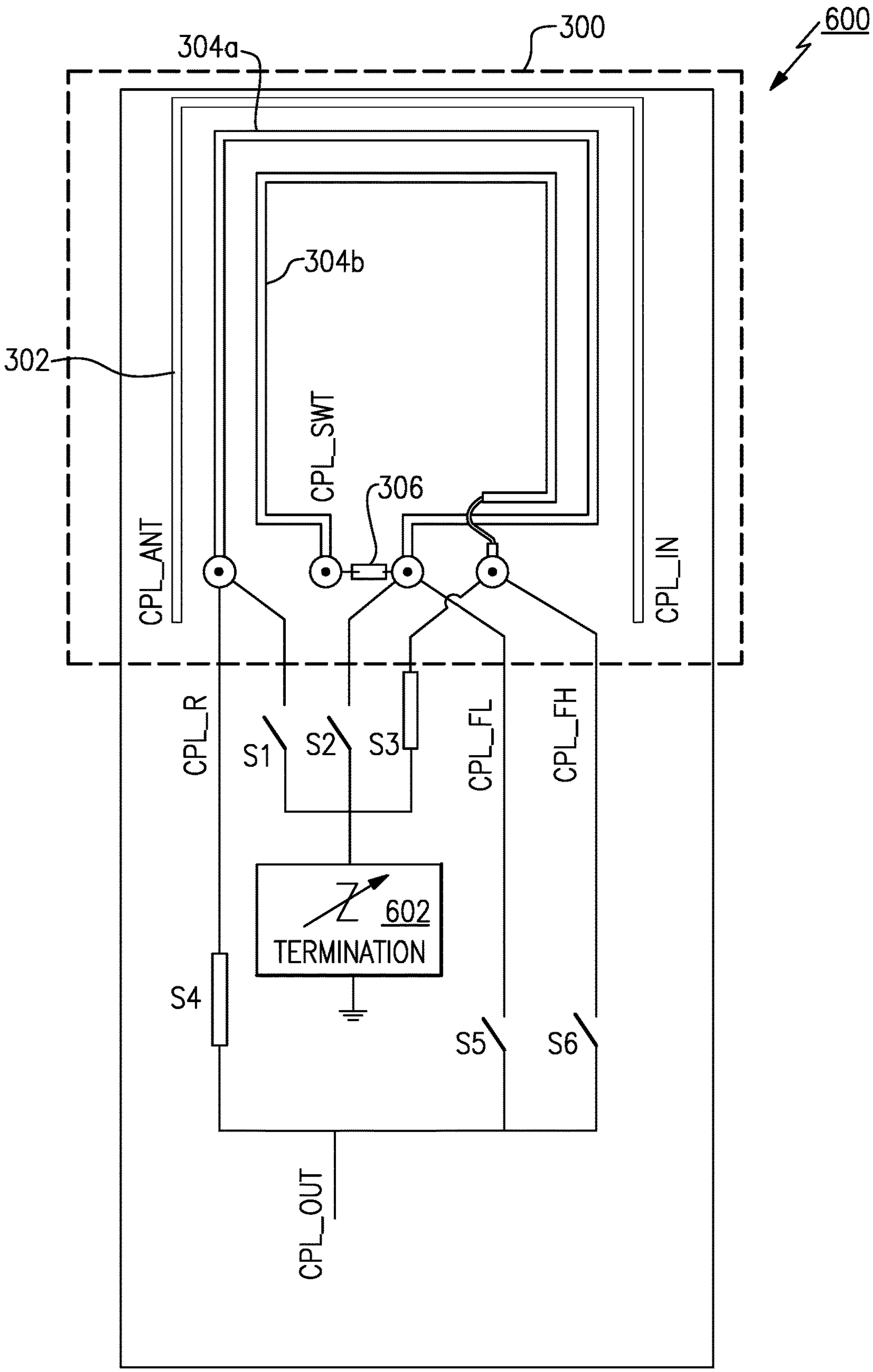
FIG. 7D is a schematic diagram of a radio frequency coupler arrangement operating in a fourth state in accordance with aspects described herein.

FIG. 7D illustrates a fourth state of the bidirectional coupler arrangement 600. In one example, the fourth state corresponds to a strong coupling in the reverse direction. In some examples, the bidirectional coupler arrangement 600 may operate in the fourth state to provide reverse coupling for lower frequency signals (e.g., the first frequency range 516 with respect to FIG. 5). As shown, the coupler 300 is operated in the first mode of operation and the switch 306 is turned on (i.e., closed) to couple the first and second segments 304*a*, 304*b* of the coupled transmission line. As such, when a radio frequency signal is applied to the second port (CPL_ANT) of the main transmission line 302, a coupled signal is provided to the reverse port (CPL_R) of the coupled transmission line via the first and second segments 304*a*, 304*b* of the coupled transmission line. In one example, the fourth switch S4 is turned on (i.e., closed) to direct the coupled signal from the reverse port (CPL_R) to the common output port (CPL_OUT). In addition, the third switch S3 is turned on (i.e., closed) to couple the second forward port (CPL_FH) of the coupled transmission line to the adjustable termination circuit 602. Being that the coupler 300 is operating in the first mode of operation, the adjustable termination circuit 602 may be configured to provide the first termination impedance optimized for lower frequency signals during the fourth state of the coupler arrangement 600.

While the bidirectional coupler 300 is described above as having two selectable segments (i.e., the first and second segments 304*a*, 304*b*), it should be appreciated that the bidirectional coupler 300 may be configured with a coupled transmission line having a different number of segments. For example, the coupler 300 may be configured with a coupled transmission line having three segments to provide optimized coupling performance for three different signal frequencies (or bands/ranges). As such, a third segment may be coupled to the first segment 304*a* and/or the second segment 304*b* of the coupled transmission line during a third mode of operation to provide a third coupling factor. In some examples, additional switches may be included to selectively couple the segments of the coupled transmission line.

Likewise, while the bidirectional coupler 300 is described above as having a main transmission line 302 and a coupled transmission line, it should be appreciated that the bidirectional coupler 300 can be configured with discrete inductors (i.e., having coils or windings). For example, the bidirectional coupler 300 may be configured with a main inductor corresponding to the main transmission line 302 and a coupled inductor corresponding to the coupled transmission line. In some examples, the coupled inductor may include two or more inductors corresponding to the first and second segments 304*a*, 304*b* of the coupled transmission line. In certain examples, the main inductor may be referred to as a primary winding of the bidirectional coupler 300 and the coupled inductor may be referred to as a secondary winding of the bidirectional coupler 300.

In addition, it should be appreciated that the bidirectional coupler 300 and the bidirectional coupler arrangement 600 may be used in a variety of wireless applications. For example, the coupler 300 and coupler arrangement 600 may be configured for use in wireless local area network (WLAN), ultra-wideband (UWB), wireless personal area network (WPAN), 4G cellular, and LTE cellular applications.

In some examples, the switch 306 of the coupler 300 and/or the switches S1-S6 of the coupler arrangement 600 may include gallium nitride (GaN), gallium arsenide (GaAs), or silicon germanium (SiGe) transistors. In certain examples, the transistors may be configured as heterojunction bipolar transistors (HBT), high-electron-mobility transistors (HEMT), metal-oxide-semiconductor field effect transistors (MOSFET), and/or complementary metal-oxide-semiconductors (CMOS). In some examples, the coupler 300 or the coupler arrangement 600, or one or more components of the coupler 300 or the coupler arrangement 600, may be fabricated using silicon-on-insulator (SOI) techniques.

Figure 8:
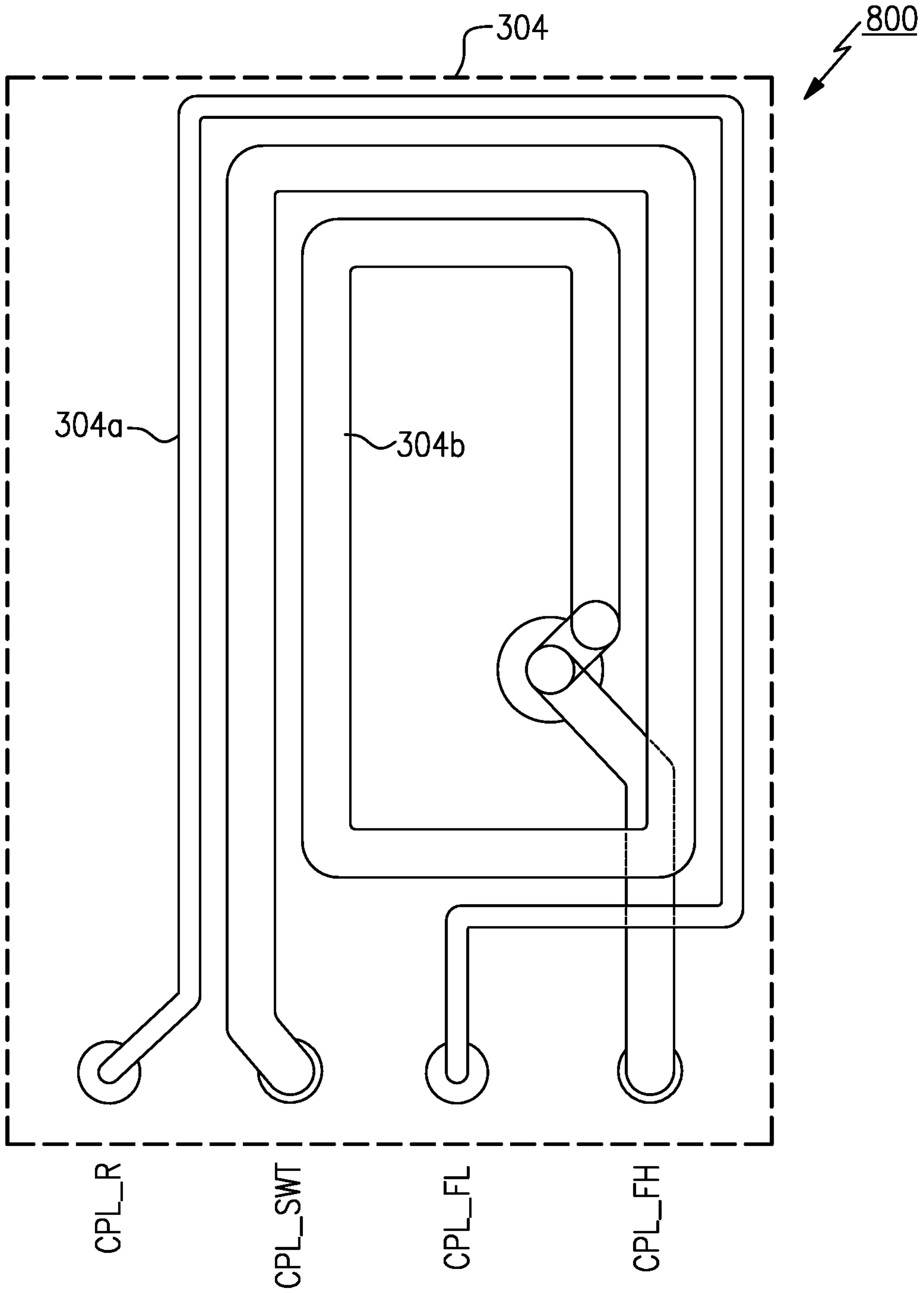
FIG. 8 is a layout of a radio frequency coupler in accordance with aspects described herein.

As described above, the coupler 300 can be arranged in a compact layout. For example. FIG. 8 illustrates a layout 800 of the coupled transmission line 304 of the coupler 300 in accordance with aspects described herein. As shown, the first and second segments 304*a*, 304*b* of the coupled transmission line 304 can be arranged in a compact layout. In one example, the footprint of the coupler 300 may be 50% smaller than alternative multi-frequency coupling solutions (e.g., two different couplers).

Embodiments of the bidirectional coupler 300 and/or the bidirectional coupler arrangement 600 described herein may be advantageously used in a variety of electronic devices. Examples of the electronic devices can include, but are not limited to, consumer electronic products, parts of consumer electronic products, electronic test equipment, cellular communications infrastructure such as a base station, etc. Examples of the electronic devices can include, but are not limited to, a router, a gateway, a mobile phone such as a smart phone, a cellular front end module, a telephone, a television, a computer monitor, a computer, a modem, a hand-held computer, a laptop computer, a tablet computer, an electronic book reader, a wearable computer such as a smart watch, a personal digital assistant (PDA), an appliance, such as a microwave, refrigerator, or other appliance, an automobile, a stereo system, a DVD player, a CD player, a digital music player such as an MP3 player, a radio, a camcorder, a camera, a digital camera, a portable memory chip, a health-care-monitoring device, a vehicular electronics system such as an automotive electronics system or an avionics electronic system, a peripheral device, a wrist watch, a clock, etc. Further, the electronic devices can include unfinished products.

As described above, an improved bidirectional coupler is provided herein. In at least one embodiment, the bidirectional coupler includes switchable inductors configured to provide an adjustable coupling factor. In some examples, the bidirectional coupler is configured to support a range of signal frequencies. In certain examples, the coupling factor is adjusted to maintain a substantially constant coupled power level while minimizing insertion loss over the range of signal frequencies.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. A radio frequency signal coupler comprising:

an input port;

an output port;

a main transmission line coupled between the input port and the output port; and a coupled transmission line electromagnetically coupled to the main transmission line, the coupled transmission line including a first transmission line, a second transmission line, and a switch configured to couple the first and second transmission lines during a first mode of operation and to decouple the first and second transmission lines during a second mode of operation.

2. The radio frequency signal coupler of claim 1 wherein the switch is configured to couple the first and second transmission lines during the first mode of operation to provide a first coupling factor and to decouple the first and second transmission lines during the second mode of operation to provide a second coupling factor.

3. The radio frequency signal coupler of claim 2 wherein the first mode of operation corresponds to configuring the radio frequency signal coupler to operate within a first frequency range and the second mode of operation corresponds to configuring the radio frequency signal coupler to operate within a second frequency range, the second frequency range being different than the first frequency range.

4. The radio frequency signal coupler of claim 3 wherein the first coupling factor operating over the first frequency range is within ±3 dB of the second coupling factor operating over the second frequency range.

5. The radio frequency signal coupler of claim 3 wherein the radio frequency signal coupler is operated in the first and second modes of operation to maintain a substantially constant insertion loss between the input port and the output port over the first and second frequency ranges.

6. The radio frequency signal coupler of claim 3 wherein the radio frequency signal coupler is configured as a bidirectional coupler and the input and output ports are each configured to receive an input radio frequency signal and provide an output radio frequency signal.

7. The radio frequency signal coupler of claim 6 further comprising at least one forward output port and a reverse output port, the coupled transmission line being coupled between the at least one forward output port and the reverse output port.

8. The radio frequency signal coupler of claim 7 wherein the at least one forward output port is configured to provide a forward coupled signal when the input radio frequency signal is received at the input port.

9. The radio frequency signal coupler of claim 8 wherein the radio frequency signal coupler is operated in the first and second modes of operation to maintain a substantially constant power level of the forward coupled signal over the first and second frequency ranges.

10. The radio frequency signal coupler of claim 7 wherein the reverse output port is configured to provide a reverse coupled signal when the input radio frequency signal is received at the output port.

11. The radio frequency signal coupler of claim 10 wherein the radio frequency signal coupler is operated in the first and second modes of operation to maintain a substantially constant power level of the reverse coupled signal over the first and second frequency ranges.

12. The radio frequency signal coupler of claim 7 wherein the at least one forward output port and the reverse port are selectively coupled to a common output port.

13. The radio frequency signal coupler of claim 7 wherein the at least one forward output port and the reverse port are selectively coupled to an adjustable termination circuit.

14. The radio frequency signal coupler of claim 13 wherein an impedance value provided by the adjustable termination circuit is adjusted based on a frequency of the input radio frequency signal.

15. The radio frequency signal coupler of claim 3 wherein the coupled transmission line includes a third transmission line and the switch is configured to couple the third transmission line to the first transmission line and/or the second transmission line during a third mode of operation corresponding to configuring the radio frequency coupler to operate within a third frequency range, the third frequency range being different than the first and second frequency ranges.

16. The radio frequency signal coupler of claim 15 wherein the switch is configured to couple the third transmission line to the first transmission line and/or the second transmission line during the third mode of operation to provide a third coupling factor.

17. A method for operating a radio frequency signal coupler, the method comprising:

receiving a radio frequency signal at one of an input port and an output port;

providing the radio frequency signal to a main transmission line coupled between the input port and the output port;

electromagnetically coupling a portion of the radio frequency signal to a coupled transmission line, the coupled transmission line including a first transmission line and a second transmission line; and operating a switch to couple the first and second transmission lines during a first mode of operation and to decouple the first and second transmission lines during a second mode of operation.

18. The method of claim 17 wherein operating the switch to couple the first and second transmission lines during the first mode of operation further includes providing a first coupling factor for the radio frequency signal coupler.

19. The method of claim 18 wherein the first coupling factor corresponds to configuring the radio frequency coupler to operate within a first frequency range.

20. The method of claim 19 wherein operating the switch to decouple the first and second transmission lines during the second mode of operation further includes providing a second coupling factor for the radio frequency signal coupler.

21. The method of claim 19 wherein the second coupling factor corresponds to configuring the radio frequency coupler to operate within a second frequency range, the second frequency range being different than the first frequency range.

22. The method of claim 21 wherein the first coupling factor operating over the first frequency range is within ±3 dB of the second coupling factor operating over the second frequency range.

23. The method of claim 21 further comprising operating the radio frequency signal coupler in the first and second modes of operation to maintain a substantially constant insertion loss between the input port and the output port over the first and second frequency ranges.

24. A radio frequency signal coupler comprising:

an input port;

an output port;

a main inductance coupled between the input port and the output port;

a coupled inductance electromagnetically coupled to the main inductance, the coupled inductance including a first inductance, a second inductance, and a switch configured to couple the first and second inductances during a first mode of operation and to decouple the first and second inductances during a second mode of operation.

* * * * *